Feb. 26, 1963    A. C. HOVEN ETAL    3,079,473
COMMUNICATION BOOTH
Filed June 20, 1960    2 Sheets-Sheet 1

WITNESS
Harry S. Brown Jr.

INVENTORS
Alfred C. Hoven
Walter E. Nordmark
BY John S. Braddock
ATTORNEY

Feb. 26, 1963  A. C. HOVEN ETAL  3,079,473
COMMUNICATION BOOTH

Filed June 20, 1960  2 Sheets-Sheet 2

WITNESS
Harry S Brown Jr

INVENTORS
Alfred C. Hoven
Walter E. Nordmark
BY John S. Braddock
ATTORNEY

United States Patent Office 3,079,473
Patented Feb. 26, 1963

3,079,473
COMMUNICATION BOOTH
Alfred C. Hoven and Walter E. Nordmark, Grand Rapids, Mich., assignors to American Seating Company, Grand Rapids, Mich., a corporation of New Jersey
Filed June 20, 1960, Ser. No. 37,118
7 Claims. (Cl. 179—149)

The present invention relates to communication booths and more particularly to student booths for use in connection with teaching laboratories or the like. In such teaching laboratories, which are primarily used for teaching foreign languages, the instructor is seated at a master console from which, through suitable electrical equipment, the instructor may direct selected recordings from master tapes to the individual student booths. The student has a headset for receiving the transmitted recordings and may have an individual volume control therefor. In the present invention the student also has a microphone by means of which he may, at the will of the instructor, record his own spoken responses on tape recorders at the master console.

The primary objects of the present invention are to provide such a communication booth for students in which the wiring leading to the control panel in the booth is concealed from view and access, and more particularly to provide a novel form of mounting for the microphone which permits the student to raise it to a convenient position for use or to lower it when not in use to a position in which it does not interfere with the student's free use of the shelf which is provided in the booth for reading, writing, etc.; and in general to provide such equipment which is sturdy in construction, reasonably economical in manufacture, and attractive in appearance.

An illustrative embodiment of the invention is shown in the accompanying drawings, wherein.

Figure 1:
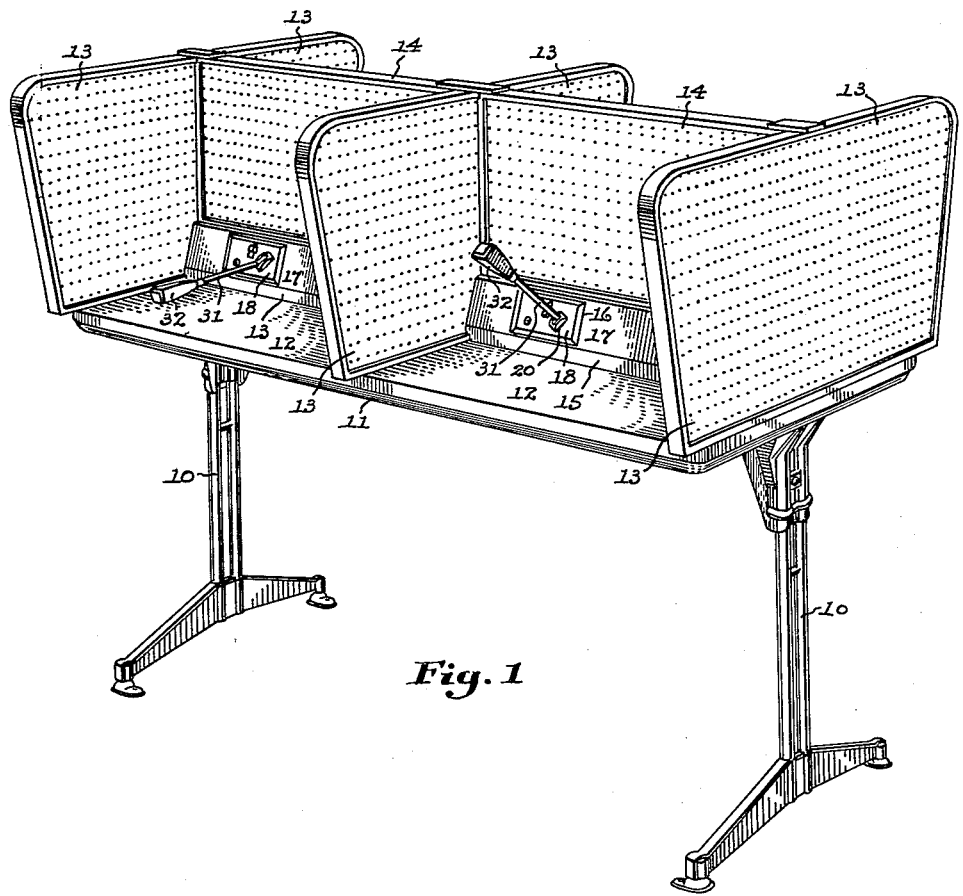
FIGURE 1 is a perspective view of a 4-student communication booth unit showing the new construction.

Referring now in detail to these drawings, FIGURE 1 shows a 4-student booth unit comprising a pair of supporting pedestals 10 on which is mounted a table top 11 and upstanding partitioning walls mounted on the table top 11 so as to divide the region above the table top into four student booths. The table top 11 is thus divided into four quarters each of which constitutes a shelf 12 for supporting reading and writing materials, etc. Each booth has upstanding side walls 13 and an upstanding rear wall 14, all of said walls being acoustically treated so as to render the individual booths sufficiently soundproof for their intended use.

A housing 15 is mounted adjacent the lower part of the rear wall 14 of each booth, said housing 15 extending between the side walls 13 of the booth and having a rectangular opening 16 in its front wall 17, intermediate said side walls 13. A student control panel 18 is mounted by means of screws 19 on the housing 15, over the opening 16, said panel 18 having an obliquely extending rectangular aperture 20 therethrough.

Figure 2:
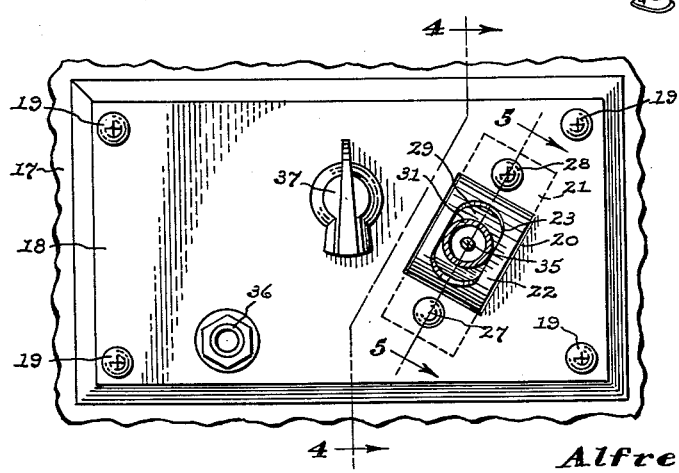
FIGURE 2 is an enlarged fragmentary front view of the student control unit which is provided in each booth, certain parts being shown in section taken on line 2—2 of FIGURE 4.
Figure 4:
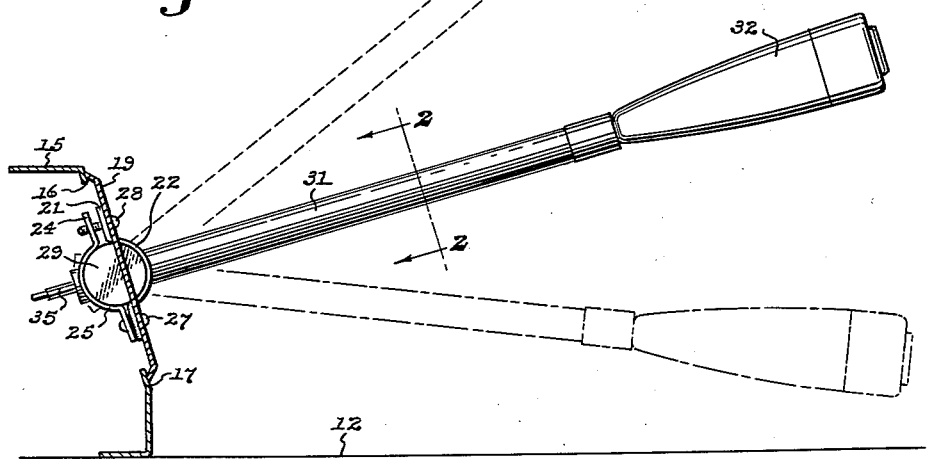
FIGURE 4 is a fragmentary vertical sectional of parts thereof taken on line 4—4 of FIGURE 2 and showing the microphone in a fully raised position in dotted lines, in an intermediate position in full lines, and in a fully lowered position in broken lines.
Figure 5:
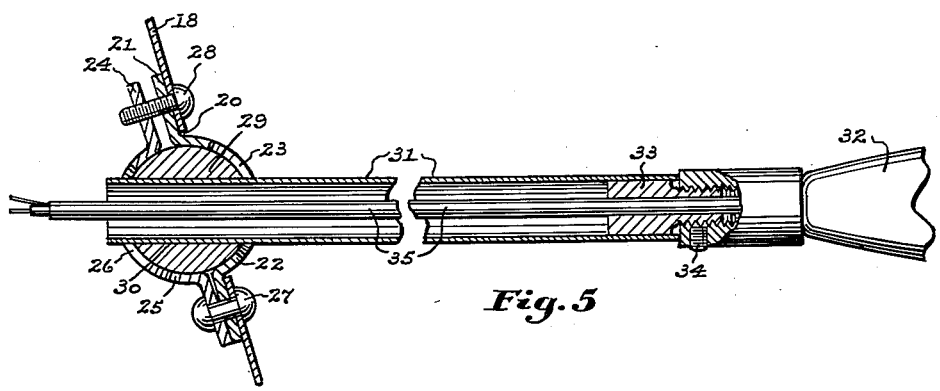
FIGURE 5 is an enlarged, fragmentary sectional view taken on line 5—5 of FIGURE 2.

As best seen in FIGURES 2, 4 and 5, a front bearing member 21 is mounted on the panel 18 and has a semi-cylindrical bearing portion 22 extending forwardly through the oblique aperture 20 and provided with an oblique slot 23 therethrough. A rear bearing member 24 is mounted adjacent the front bearing member 21 and has a semi-cylindrical bearing portion 25 extending rearwardly of the oblique aperture 20 in the panel 18 and provided with an oblique slot 26 therethrough in registry with the slot 23 in the front bearing member 21. The lower ends of the front and rear bearing members 21 and 24 are secured to the control panel 18 by means of a rivet 27, while the upper ends of these bearing members are secured to the panel 18 by means of an adjustment screw 28 the purpose of which is hereinafter explained.

A cylinder 29 is mounted for rotation about an oblique axis in the cylindrical bearing formed between the front and rear bearing members 21 and 24. This cylinder 29 has a forwardly-rearwardly extending bore 30 therethrough in registry with the slots 23 and 26 in the front and rear bearing members respectively. A hollow shaft 31 has its rearward end seated in the bore 30 of cylinder 29 and secured thereto, said shaft 31 projecting through the oblique slots 23 and 26 of the bearing members 21 and 24 respectively. A microphone 32 is mounted on the outer or forward end of the shaft 31, being threaded onto a plug 33 seated in the outer end of the hollow shaft and being secured thereto by means of a set screw 34 (see FIGURE 5). Electrical connections or wires 35 extend from the microphone 32 through the hollow shaft 31 and into the housing 15, and thence to a suitable recording apparatus in the master console of the teaching laboratory.

Figure 3:
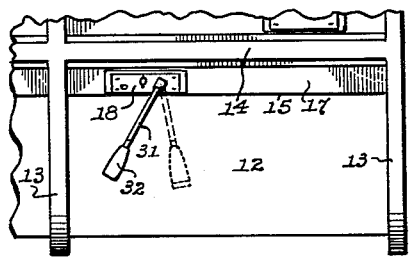
FIGURE 3 is a top plan view of one booth, showing the microphone in a raised position of use in full lines and in a lowered position of non-use in dotted lines.

It will be seen that the microphone 32 is swingable with shaft 31 and cylinder 29, between a lowered non-use position adjacent a corner formed between the booth's shelf 12 and one of its side walls 13 and a raised position of use near the front center of the booth. This unique action is due to the oblique axis of swinging movement of the microphone. When in its lowered position of non-use, as seen in solid lines in FIGURE 3 and in broken lines in FIGURE 4, it is out of the way of the student in his use of the shelf 12 for reading or writing. Friction between the bearing members 21 and 24 and the cylinder 29 may be adjusted by tightening or loosening the adjustment screw 28 so that the microphone may be made to swing more or less freely as desired.

As shown, the student control panel 18 is provided with a jack 36 into which may be plugged the student's headphones (not shown), and a volume control 37 for adjusting the sound level. Suitable electrical connections (also not shown) to the jack 36 and volume control 37, would also extend through the housing 15.

It will thus be seen that the invention provides a communication booth for a teaching laboratory or the like which is well designed and arranged for its intended use, and while but one specific embodiment of the invention has been herein shown and described it will be understood that numerous details thereof may be altered or omitted without departing from the spirit of the invention as defined by the following claims.

We claim:

1. In a communication booth having a shelf, upstanding side walls and an upstanding rear wall: a microphone mounted on the forward end of a shaft having its rearward end mounted for pivotal movement about an oblique axis adjacent the lower rear wall of the booth intermediate said side walls, whereby the shaft revolves about said oblique axis in a plane perpendicular thereto between positions wherein the microphone occupies a lowered position adjacent the corner formed between said shelf and one of said side walls or a raised position near the front center of the booth.

2. In a communication booth having a shelf, upstanding side walls and an upstanding rear wall: a housing mounted adjacent the lower part of said rear wall and having an opening in its front wall intermediate said side walls; a control panel mounted on the housing over said opening; and a microphone mounted on the forward end of a shaft having its rearward end mounted for pivotal movement about an oblique axis on said control panel, whereby the shaft revolves about said oblique axis in a plane perpendicular thereto between positions wherein the microphone occupies a lowered position adjacent the corner formed between said shelf and one of said side walls or a raised position near the front center of the booth.

3. A structure according to claim 2 in which the shaft is hollow and the microphone has electrical connections extending therefrom through the hollow shaft and into the housing.

4. A structure according to claim 2 in which the pivotal mounting of the rearward end of the shaft on the control panel comprises: a front bearing member mounted on said panel and having a semi-cylindrical bearing extending forwardly of an oblique rectangular aperture through said control panel, said bearing portion having an oblique slot therethrough; a rear bearing member mounted adjacent the front bearing member and having a semi-cylindrical bearing portion extending rearwardly of the oblique aperture in the control panel; and a cylinder mounted for rotation about an oblique axis in the cylindrical bearing formed between said bearing members, the rearward end of said shaft being connected to said cylinder for rotation therewith and extending through the slot in said front bearing member.

5. A structure according to claim 4 having means whereby the front and rear bearing members may be drawn together or separated for adjusting the amount of friction between the bearing members and the cylinder.

6. In a communication booth having a shelf, upstanding side walls and an upstanding rear wall: a housing mounted adjacent the lower part of said rear wall and having an opening in its front wall intermediate said side walls; a control panel mounted on the housing over said opening and having an obliquely extending rectangular aperture therethrough; a front bearing member mounted on said panel and having a semi-cylindrical bearing portion extending forwardly of said aperture and provided with an oblique slot therethrough; a rear bearing member mounted adjacent the front bearing member and having a semi-cylindrical bearing portion extending rearwardly of said aperture and provided with an oblique slot therethrough in registry with the slot in the front bearing member; a cylinder mounted for rotation about an oblique axis in the cylindrical bearing formed between said bearing members, said cylinder having a forward-rearwardly extending bore therethrough in registry with said slots; a hollow shaft having its rearward end seated in said bore and projecting through the slots in the bearing members, said shaft projecting forwardly from the control panel into the booth; a microphone mounted on the forward end of said shaft and having electrical connections extending therefrom through the hollow shaft and into the housing, said microphone being movable with the shaft and the cylinder about said oblique axis in a plane perpendicular thereto, between a lowered position adjacent the corner formed between said shelf and one of said side walls and a raised position near the front center of the booth.

7. A structure according to claim 6 in which a rivet passes through the control panel and the lower parts of said bearing members to secure these parts together, and a screw passes through the panel and the upper parts of said bearing members whereby the friction between the bearing members and the cylinder may be adjusted.

References Cited in the file of this patent

UNITED STATES PATENTS

| | | |
|---|---|---|
| 758,304 | Fergusson | Apr. 26, 1904 |
| 2,404,539 | Schmidt | July 23, 1946 |
| 2,581,251 | Glazer et al. | Jan. 1, 1952 |
| 2,598,045 | Fox et al. | May 27, 1952 |

OTHER REFERENCES

Purchase Guide for Programs in Science, Math. and Languages (published 1959), pages 269–270.

U.S. Dept. Health, Education and Welfare—Bulletin 1959—No. 3 (published 1958), pages 22–23.

Magnetic Recording Industries—Languages Lab. Planning, copyrighted 1958, page 1.